United States Patent
Takaoka

(10) Patent No.: US 9,185,512 B2
(45) Date of Patent: Nov. 10, 2015

(54) INFORMATION PROCESSING APPARATUS, INFORMATION PROCESSING METHOD, AND PROGRAM

(71) Applicant: SONY CORPORATION, Tokyo (JP)

(72) Inventor: Tomohisa Takaoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/672,175

(22) Filed: Nov. 8, 2012

(65) Prior Publication Data
US 2013/0166559 A1    Jun. 27, 2013

(30) Foreign Application Priority Data
Dec. 22, 2011  (JP) ................................. 2011-281351

(51) Int. Cl.
| | |
|---|---|
| H04W 4/00 | (2009.01) |
| G01S 19/13 | (2010.01) |
| G01S 19/42 | (2010.01) |
| H04W 4/02 | (2009.01) |

(52) U.S. Cl.
CPC ............... *H04W 4/001* (2013.01); *G01S 19/13* (2013.01); *G01S 19/42* (2013.01); *H04W 4/023* (2013.01)

(58) Field of Classification Search
CPC ....... G06F 15/00; G06F 3/0346; G06F 11/00; G06F 17/3071; G06F 17/30864; G06F 17/30705; G06F 17/30265; G06F 17/30386; G06F 17/30598; G06F 3/04815; G06F 17/00; G06F 17/30; G06F 19/00; G01S 19/13; G01S 19/42; H04W 4/001; H04W 4/023
USPC .......... 707/711–769, 705, E17.046; 307/104; 702/150, 189, 104, 5, 89, 179; 705/13, 705/14.58, 14.66; 342/464; 455/405, 41.2, 455/456.1, 456.3, 550.1; 463/31; 700/224; 701/2, 23, 400, 409; 709/224; 710/315; 73/1.41
See application file for complete search history.

(56) References Cited

U.S. PATENT DOCUMENTS

| | | | | |
|---|---|---|---|---|
| 7,529,639 | B2 * | 5/2009 | Rasanen et al. | 702/150 |
| 7,646,336 | B2 * | 1/2010 | Tan et al. | 342/357.31 |
| 8,539,567 | B1 * | 9/2013 | Logue et al. | 726/7 |
| 2006/0079248 | A1 * | 4/2006 | Otsuka et al. | 455/456.1 |
| 2006/0158175 | A1 * | 7/2006 | Mori et al. | 324/76.61 |
| 2007/0011745 | A1 * | 1/2007 | Mitomo et al. | 726/24 |
| 2007/0222674 | A1 * | 9/2007 | Tan et al. | 342/357.02 |
| 2007/0283001 | A1 * | 12/2007 | Spiess et al. | 709/224 |

(Continued)

FOREIGN PATENT DOCUMENTS

JP    2006-38792    2/2006

OTHER PUBLICATIONS

Huber, Denis. "Background Positioning for Mobile devices—Android vs. iphone." Joint Conference of IEEE Computer & Communication Societies. Apr. 2011.*

(Continued)

*Primary Examiner* — Hosain Alam
*Assistant Examiner* — Diedra McQuitery
(74) *Attorney, Agent, or Firm* — Hazuki International, LLC

(57) ABSTRACT

There is provided an information processing apparatus including a transmission section which transmits, to an external device that has collected an index pertaining to a feature of an output of a sensor for each classification, classification information for specifying the classification, and a reception section which receives information about the index corresponding to the classification information.

14 Claims, 8 Drawing Sheets

(56) References Cited

U.S. PATENT DOCUMENTS

2011/0141909 A1* 6/2011 Hibara et al. ................ 370/241
2012/0053889 A1* 3/2012 Sambongi .................... 702/150
2012/0198099 A1* 8/2012 Kwon et al. ...................... 710/8

OTHER PUBLICATIONS

Zandbergen, Paul A., and Sean J. Barbeau. "Positional accuracy of assisted gps data from high-sensitivity gps-enabled mobile phones." Journal of Navigation 64.03 (Jul. 2011): 381-399.*

Krnjajić, Milovan, Athanasios Kottas, and David Draper. "Parametric and nonparametric Bayesian model specification: A case study involving models for count data." Computational Statistics & Data Analysis 52.4 (2008): 2110-2128.*

North, Matthew A. "An Empirical Analysis of Mobile Smart Device Accuracy and Efficiency in GPS-Enabled Field Data Collection." Issues in Information Systems, vol. XII, No. 1, pp. 318-327, 2011.*

* cited by examiner

INFORMATION PROCESSING APPARATUS, INFORMATION PROCESSING METHOD, AND PROGRAM

BACKGROUND

The present disclosure relates to an information processing apparatus, an information processing method, and a program.

Nowadays, information processing apparatuses having various types of sensors thereon are in widespread use. For example, as examples of the sensors mounted on an information processing apparatus, there are given an acceleration sensor, a geomagnetic sensor, a pressure sensor, a GPS sensor, and the like. Those sensors are each capable of outputting a detection value according to the state of the information processing apparatus on which the sensor is mounted. The output is sometimes used for causing the position of the information processing apparatus to be detected, for example. Alternatively, the output is sometimes used for detecting a tilt of a housing used for operation input performed by the information processing apparatus, for example.

Incidentally, to the detection value output from a sensor, an index indicating the feature of the detection value may be assigned. For example, error/accuracy of position information to be detected may be assigned to an output value of a GPS sensor. An application that uses the detection value output from the sensor can process the detection value based on the index. For example, JP 2006-038792A discloses a satellite signal reception processing apparatus which performs positioning calculation when a positional accuracy index is equal to or less than a predetermined threshold.

SUMMARY

However, the assignment of the index used here may be performed based on different standards for each classification mainly such as a model or the like of a terminal in most of the cases. Accordingly, the following may differ for each classification: how the application should handle the detection value output by the sensor by using the index.

In light of the foregoing, the present disclosure provides an information processing apparatus, an information processing method, and a program, which are capable of acquiring information about an index collected in a server for each classification.

According to an embodiment of the present disclosure, there is provided an information processing apparatus which includes a transmission section which transmits, to an external device that has collected an index pertaining to a feature of an output of a sensor for each classification, classification information for specifying the classification, and a reception section which receives information about the index corresponding to the classification information.

According to another embodiment of the present disclosure, there is provided an information processing method which includes transmitting, to an external device that has collected an index pertaining to a feature of an output of a sensor for each classification, classification information for specifying the classification, and receiving information about the index corresponding to the classification information.

According to another embodiment of the present disclosure, there is provided a program for causing a computer to function as an information processing apparatus including a transmission section which transmits, to an external device that has collected an index pertaining to a feature of an output of a sensor for each classification, classification information for specifying the classification, and a reception section which receives information about the index corresponding to the classification information.

According to the embodiments of the present disclosure described above, the information about an index collected in a server for each classification can be acquired.

DETAILED DESCRIPTION OF THE EMBODIMENT(S)

Figure 1:
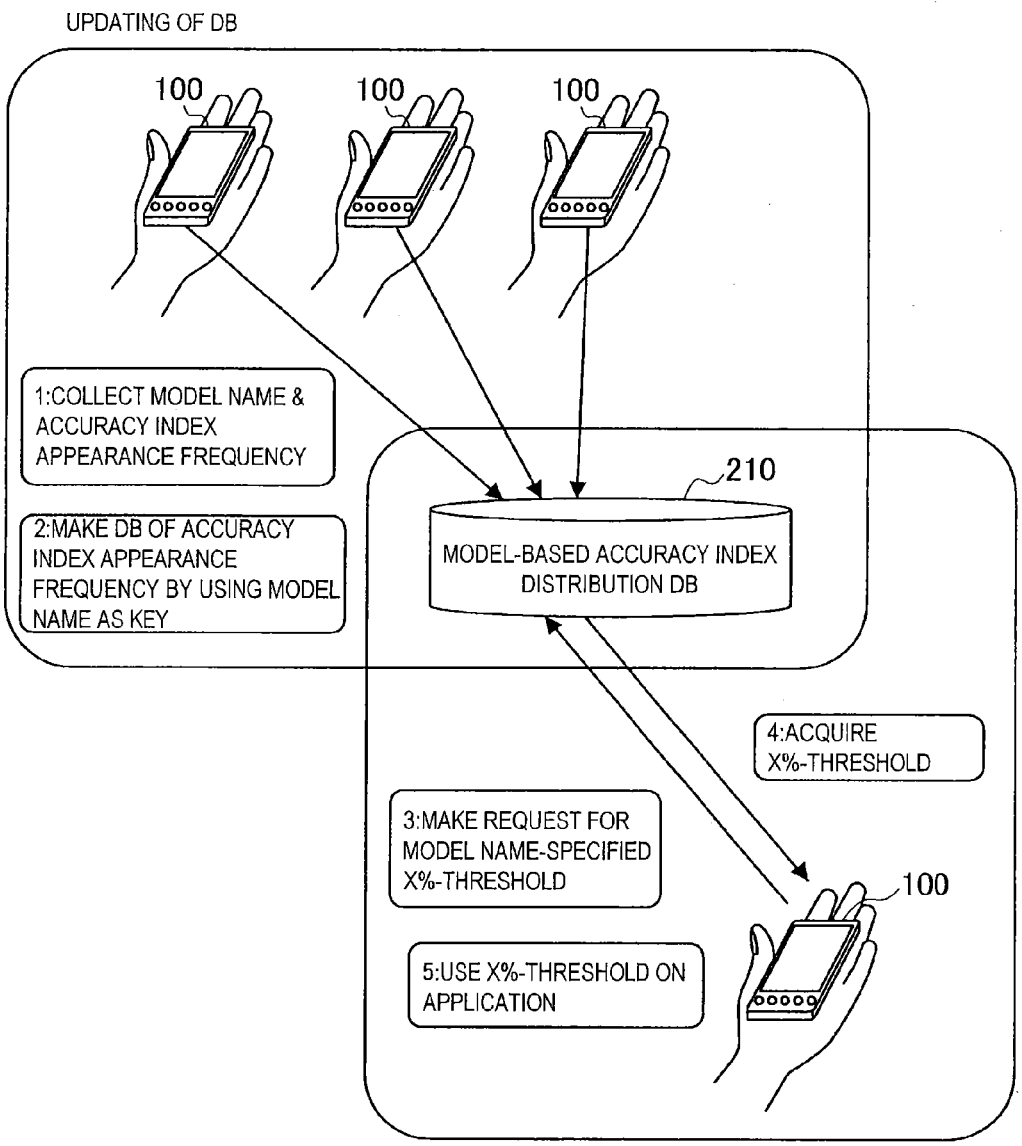
FIG. 1 is an explanatory diagram showing an overview of a system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Overview
2. Functional Configuration
3. Operation
4. Hardware Configuration
5. Modified Example <1. Overview>

Figure 2:
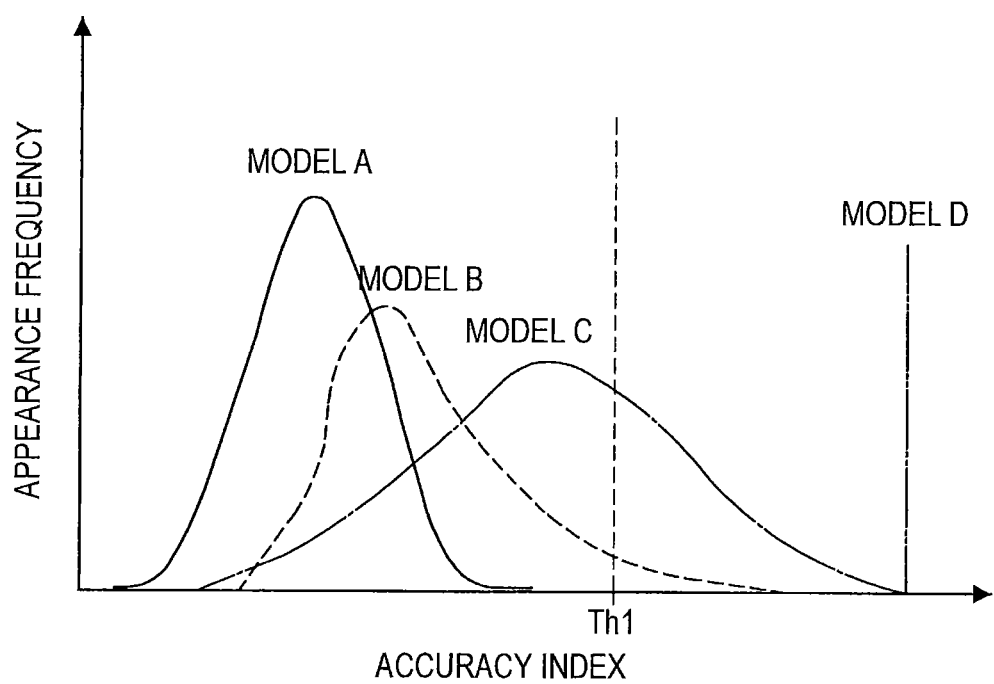
FIG. 2 is a graph showing an example of model-based appearance frequency distribution of accuracy indices, which is collected by the system according to the embodiment.

First, with reference to FIG. 1 and FIG. 2, an overview of a system according to an embodiment of the present disclosure will be described. FIG. 1 is an explanatory diagram showing an overview of a system according to an embodiment of the present disclosure. FIG. 2 is a graph showing an example of model-based appearance frequency distribution of accuracy indices, which is collected by the system according to the embodiment.

Note that there are various sensors to which the technique of the present disclosure applies as described above, and an index to be mainly assigned differs for each target sensor. However, hereinafter, the description will be made using as an example a case where the present technology is applied to an accuracy index (positional error) assigned to position information acquired by a GPS sensor.

First, with reference to FIG. 1, an overview of a system according to an embodiment of the present disclosure will be described. The system according to an embodiment of the present disclosure collects, from multiple terminal devices 100, model names and the appearance frequency of accuracy indices, and uses a model-based accuracy index distribution DB 210 obtained by making a database of appearance frequencies of accuracy indices using models name as keys.

An error of position information differs depending on an environment in which the position is measured. For example, at a location at which multiple strong GPS signals can be received, position information with high accuracy (i.e., with small positional error) can be obtained. In such a location, an accuracy index indicating that the positional error is small is assigned to the position information.

However, the assignment of accuracy index may not be performed based on a unified standard. For example, a standard for accuracy index-assignment may differ depending on a model of a terminal device 100. Further, there may be a model which does not perform accuracy index-assignment. Further, in one model, the accuracy index may show the positional error using a distance, and on the other hand, in another model, the accuracy index may show a classified positional error (for example, high, medium, or low) in accordance with the degree of the positional error.

Further, there may be a case where, when models each showing the positional error using a distance are compared with each other, the appearance frequency distributions vary from each other as shown in FIG. 2. In the graph of FIG. 2, the horizontal axis represents the accuracy index (for example, positional error shown using distance), and the vertical axis represents appearance frequency of the accuracy indices (for example, the number of times of assignments). In this way, a peak value of frequency at which the accuracy index appears and a standard to be used may differ for each model. For example, a model D shows a certain accuracy index. In this case, it is highly likely that the model D does not actually determine the accuracy of the position information.

Accordingly, when using an application that provides a service using position information for example, in the case of attempting to use different processes based on the accuracy index, there may be a case where operation is not executed normally when using a certain threshold. For example, let us assume the case where threshold processing based on the accuracy index is executed by using a threshold Th1 shown in FIG. 2. In the case of the accuracy index showing the positional error using a distance, a larger value of the accuracy index represents larger error and lower accuracy. Accordingly, for example, the threshold processing may be performed by discarding the position information having the accuracy index that is equal to or more than the threshold Th1, and only using the position information having the accuracy index that is less than the threshold Th1. In this case, as for a model A, the accuracy indices assigned to all pieces of position information are smaller than the threshold Th1. Further, as for a model B, the accuracy indices assigned to several percent of pieces of position information out of the acquired pieces of position information are larger than the threshold Th1. Further, as for a model C, the accuracy indices assigned to most of the acquired pieces of position information are larger than the threshold Th1, and many pieces of position information are discarded. Further, as for the model D, the accuracy indices assigned to all pieces of position information are larger than the threshold Th1, and all pieces of position information are discarded.

Accordingly, in such a case, the model C and the model D do not operate normally since most of or all pieces of position information are discarded. Further, it is also difficult for the model A to fulfill the intention of discarding position information with low accuracy. Further, under the present circumstances, the variation of appearance frequency distribution does not necessarily reflect the difference of accuracy of the accuracy of GPS sensors. That is, the model A has accuracy indices being assigned thereto, the accuracy indices having smaller values as a whole than the accuracy indices of the model C, that is, indicating that the accuracy is higher than that of the model C. However, the model A is actually not capable of acquiring all the time the position information having accuracy higher than that of the model C, and the variation is largely caused by difference in the standard for accuracy index-assignment.

Accordingly, in the case of attempting to correctly perform processing based on the accuracy index in an application using the position information, there arises a request of attempting to recognize the appearance frequency distribution of the accuracy indices. However, for example, in order for a developer of the application to obtain information of the appearance frequency distribution, the developer accumulates pieces of information of accuracy indices acquired by respective models, investigates the behavior thereof, and sets a threshold. Those works involve a great amount of time and effort. In order to create an application that operates normally in all models, it is necessary that the above-mentioned investigation be performed for all models. Further, each time a new model is put on sale, the same investigation has to be performed.

Further, a trend of the accuracy index may be learned in each terminal device 100. In this case, the burden imposed on the developer of the application is saved. However, in order to accurately recognize the trend of the accuracy index, it is necessary that information be collected for a certain period of time. Accordingly, the present disclosure suggests the use of the model-based accuracy index distribution DB 210 as described above. The model-based accuracy index distribution DB 210 can collect information about the accuracy index from multiple terminal devices 100. Accordingly, the time period necessary for recognizing the feature of the accuracy indices can be reduced dramatically compared to the case where the terminal devices 100 each collecting information. Further, if the application using the position information uses the information about the accuracy indices collected in the server, the burden imposed on every application developer performing investigation for each accuracy index is saved.

Here, with reference to FIG. 1 again, paying attention to a stage of updating information collected in the database, pieces of information are collected from multiple terminal devices 100 into the model-based accuracy index distribution DB 210. Here, the terminal device 100 collects the appearance frequency of the assigned accuracy indices for a certain period of time and collectively transmits the information to the model-based accuracy index distribution DB 210, but the present technology is not limited thereto. The terminal device 100 may transmit the information to the model-based accuracy index distribution DB 210 each time the accuracy index is assigned, that is, each time the sensor detects the information. In this case, the information to be transmitted to the model-based accuracy index distribution DB 210 may be the assigned accuracy index itself and the model name. The collected pieces of information may be aggregated by model and may be held in a form of information indicating appearance frequency distribution of accuracy indices.

Further, paying attention to a stage of using information collected in the database, an application operating in the terminal device 100 makes a request to the model-based accuracy index distribution DB 210 for desired information and acquires the desired information, and thus can use the acquired information on the application. For example, terminal device 100 transmits, to the model-based accuracy index distribution DB 210, an acquisition condition of desired information including the model name. For example, the acquisition condition may be an x %-threshold. The x %-threshold is, for example, a threshold used for identifying top x % data. For example, the terminal device 100 can use the x %-threshold and can use the top x % data on the application. For example, the application can use the x %-threshold and can discard the position information having an accuracy index that is equal to or more than the threshold.

Heretofore, the overview of the system according to an embodiment of the present disclosure has been described. Hereinafter, there will be described in detail a configuration and operation for realizing such functions.

<2. Functional Configuration>

Figure 3:
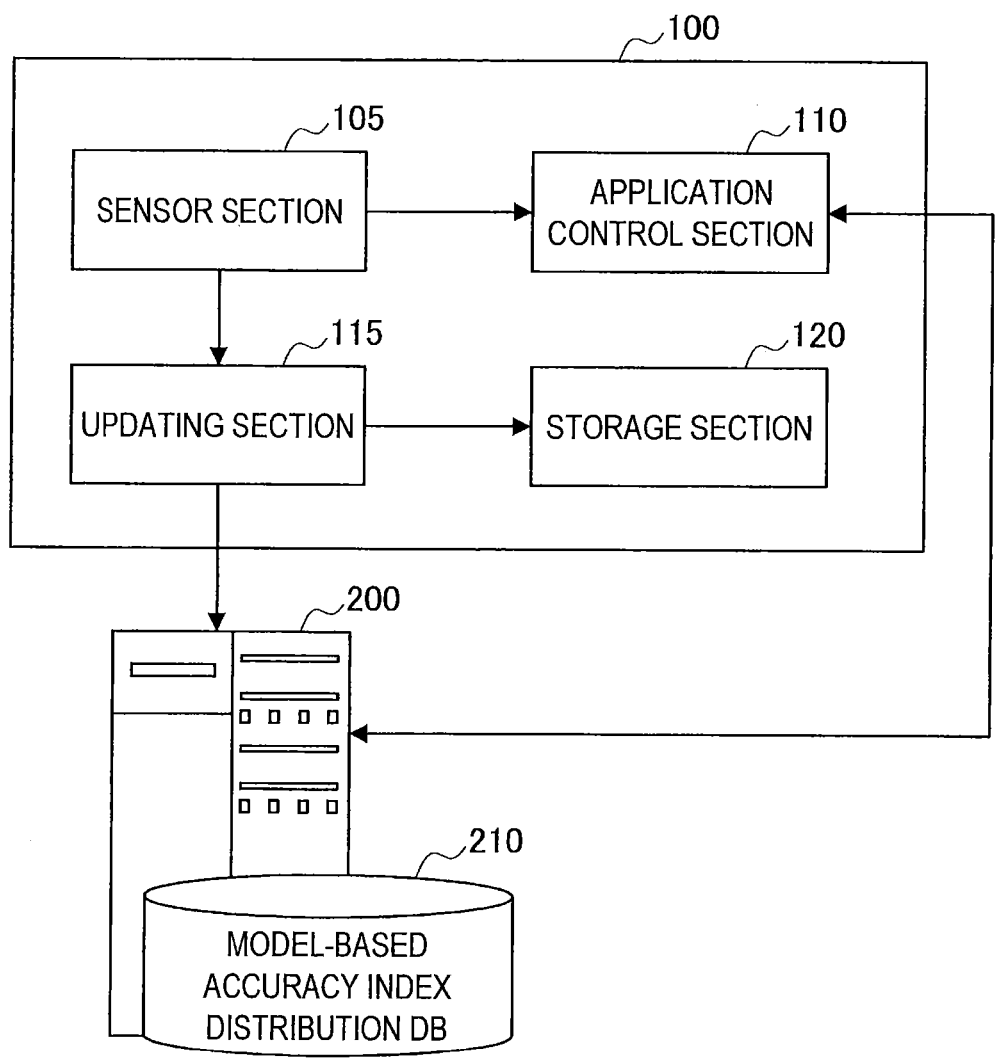
FIG. 3 is a block diagram showing a functional configuration of a terminal device according to the embodiment.
Figure 4:
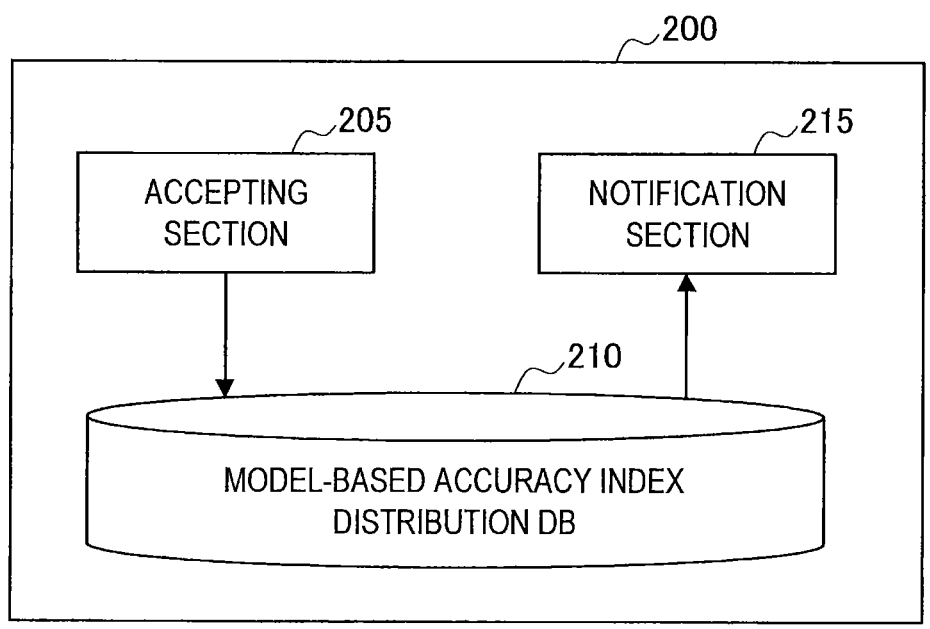
FIG. 4 is a block diagram showing a functional configuration of an index information server according to the embodiment.
Figure 5:
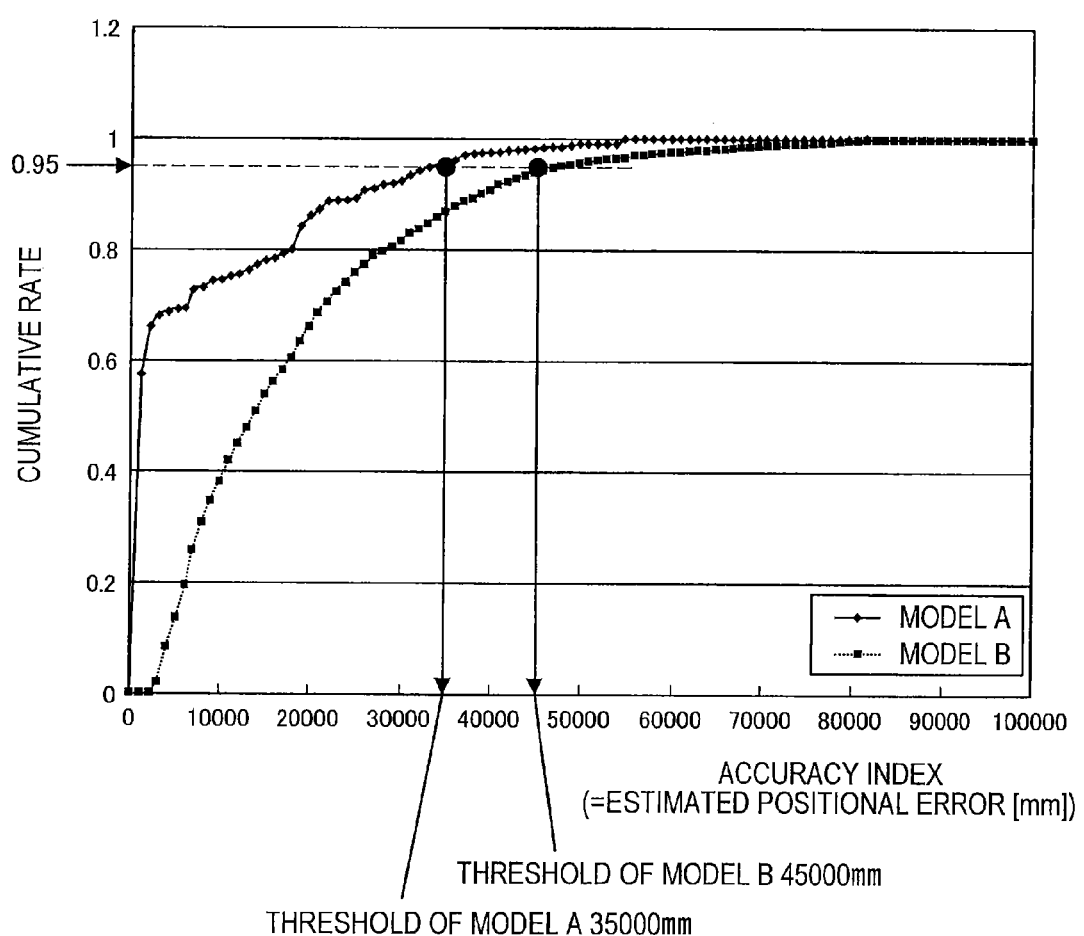
FIG. 5 is an explanatory diagram showing an example of information that the index information server according to the embodiment provides from collected accuracy index distribution.

Next, with reference to FIGS. 3 to 5, a functional configuration of a terminal device and a functional configuration of an index information server according to an embodiment of the present disclosure will each be described. FIG. 3 is a block diagram showing a functional configuration of a terminal device according to the embodiment. FIG. 4 is a block diagram showing a functional configuration of an index information server according to the embodiment. FIG. 5 is an explanatory diagram showing an example of information that the index information server according to the embodiment provides from collected accuracy index distribution.

((Terminal Device 100))

First, with reference to FIG. 3, a configuration of a terminal device 100 according to an embodiment of the present disclosure will be described. The terminal device 100 is an information processing apparatus used by a user. The terminal device 100 may be an information processing apparatus such as a mobile phone, a personal handyphone system (PHS), a music playback device, a video processing device, a game console, a personal computer (PC), and a personal data assistance (PDA).

The terminal device 100 mainly includes a sensor section 105, an application control section 110, an updating section 115, and a storage section 120.

(Sensor Section 105)

The sensor section 105 has a function of detecting a state and the like of the terminal device 100. Here, although the sensor section 105 is a GPS sensor, the present technology is not limited thereto. For example, the sensor section 105 may be a sensor such as a GPS sensor, an acceleration sensor, a geomagnetic sensor, or a pressure sensor. The sensor section 105 can assign an index pertaining to a feature of an output of the sensor to the output of the sensor. Here, in the case of using the GPS sensor, the index pertaining to the feature of the sensor may be an accuracy index indicating an error of position information output by the GPS sensor. The accuracy index may be shown as a distance of the error, for example. Further, the accuracy index may be an index showing a degree of error at multiple stages. The sensor section 105 can detect current position information, and can also assign to the position information and output the accuracy index of the detected position information.

(Application Control Section 110)

The application control section 110 can control an application function using a detection value acquired by the sensor section 105. The application control section 110 has a function of acquiring a threshold determined based on distribution information of accuracy indices from an index information server 200. The application control section 110 can control the application function using the acquired threshold. As will be described in detail later, the index information server 200 collects the distribution of accuracy indices by performing classification by model. The application control section 110 can transmit classification information for specifying the classification, that is, model information of the terminal device 100 in this case, to the index information server 200, and can receive a threshold determined based on the distribution of accuracy indices corresponding to the model information from index information server 200. That is, the application control section 110 is an example of a transmission section that transmits, to the index information server 200 which has collected accuracy indices for each classification, the classification information for specifying the classification of the terminal device 100. Further, the application control section 110 is also an example of a reception section that receives information about the index corresponding to the classification information.

Here, as typical examples of the application function controlled by the application control section 110, there are given a navigation function and a travel trajectory logging function. In addition, the application function may be any function that uses a GPS sensor. For example, the application control section 110 can process information output from the GPS sensor by using the threshold acquired from the index information server 200. For example, the application control section 110 can acquire a 95%-threshold from the index information server 200. For example, when the application function attempts to identify position information having bottom 5% accuracy index, the application control section 110 can process position information by using the acquired 95%-threshold. For example, the application control section 110 may determine position information having bottom 5% accuracy index based on the threshold, and may not use such position information for the application function. It is highly likely that position information with a large accuracy index include a large error. Accordingly, the application control section 110 can improve measurement accuracy by performing threshold processing based on accuracy indices and using the position information having a relatively small error. That is, the application control section 110 is also an example of a processing section that processes an output of the sensor section 105 in accordance with the information acquired from the index information server 200.

(Updating Section 115)

The updating section 115 has a function of updating information of the model-based accuracy index distribution DB 210. The updating section 115 can transmit the acquired accuracy index and the model information of the terminal device 100 to the index information server 200 so that information of the model-based accuracy index distribution DB 210 is updated using the accuracy index of the position information acquired by the sensor section 105. The updating section 115 can update the information at a timing according to a frequency that the sensor section 105 acquires the position information. For example, in the case where the frequency that the sensor section 105 acquires the position information is sufficiently low, the updating section 115 may update the information each time the sensor section 105 acquires the position information. Further, in the case where the frequency that the sensor section 105 acquires the position information is high to some extent, the updating section 115 can update the information collectively at a predetermined cycle or at the time of completion of the application. When the updating section 115 collectively updates the information, the updating section 115 may aggregate the appearance frequency of the acquired accuracy indices and may generate appearance frequency distribution information. In this case, the updating section 115 can transmit model information of the terminal device 100 and the generated appearance frequency distribution information to the index information server 200.

(Storage Section 120)

The storage section 120 is a device for storing data, and can include a storage medium, a recording device for recording data in the storage medium, a reading device for reading the data from the storage medium, and a deletion device for deleting the data recorded in the storage medium. Here, as the storage medium, there may be used a non-volatile memory such as a flash memory, a magnetoresistive random access memory (MRAM), a ferroelectric random access memory (FeRAM), a phase change random access memory (PRAM), and an electronically erasable and programmable read only memory (EEPROM), and a magnetic recording medium such as a hard disk drive (HDD). When the updating section 115 collectively updates information, the storage section 120 can store information of accuracy index used for the updating. The information of accuracy index may be an accuracy index itself, or may be the above-mentioned appearance frequency distribution information.

((Index Information Server 200))

Next, with reference to FIG. 4, a functional configuration of an index information server 200 will be described. The index information server 200 has a function of collecting information of accuracy index distribution by model and providing the terminal device 100 with information about accuracy index based on the collected information.

The index information server 200 mainly includes an accepting section 205, a model-based accuracy index distribution DB 210, and a notification section 215.

(Accepting Section 205)

The accepting section 205 has a function of accepting information from multiple terminal devices 100 and updating information of the model-based accuracy index distribution DB 210. The accepting section 205 can update accuracy index distribution information of a classification corresponding to model information included in information received from the terminal device 100. The accepting section 205 may update the information of the model-based accuracy index distribution DB 210 each time the accepting section 205 accepts information. Alternatively, the accepting section 205 may collectively update information at regular intervals using multiple pieces of information that have been accepted.

(Model-based Accuracy Index Distribution DB 210)

The model-based accuracy index distribution DB 210 is a database which stores appearance frequency distribution information of accuracy indices aggregated by model. Information of the model-based accuracy index distribution DB 210 is updated by the accepting section 205, and the model-based accuracy index distribution DB 210 can provide the notification section 215 with information.

(Notification Section 215)

The notification section 215 has a function of providing information about accuracy index in response to a request from the terminal device 100, based on information stored in the model-based accuracy index distribution DB 210. For example, FIG. 5 shows a model-based cumulative rate of accuracy index. In this example, when the terminal device 100 makes a request for the 95%-threshold of the model A, the notification section 215 can notify the terminal device 100 of a value at which the cumulative rate becomes 0.95, which is 35000 mm, as the 95%-threshold. Further, in this example, when the terminal device 100 makes a request for the 95%-threshold of the model B, the notification section 215 can notify the terminal device 100 of a value at which the cumulative rate becomes 0.95, which is 45000 mm, as the 95%-threshold. Note that there may be some models that are not equipped with the function of determining the accuracy index, and that performs assignment of fixed information at all times regardless of the accuracy. In such a case, that is, in the case where distribution of a certain model does not exist and only fixed pieces of information are collected, the notification section 215 may transmit that effect to the terminal device 100.

Heretofore, there have been shown examples of the functions of the terminal device 100 and the index information server 200 according to the present embodiment. Each of the above structural elements may be configured using general-purpose members or circuits, or may be configured using hardware specialized for the function of each structural element. Further, the function of each structural element may be realized by reading, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing respective functions of the terminal device 100 and the index information server 200 according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example. Note that examples of hardware configurations of the terminal device 100 and the index information server 200 will be described below.

<3. Operation>

Figure 6:
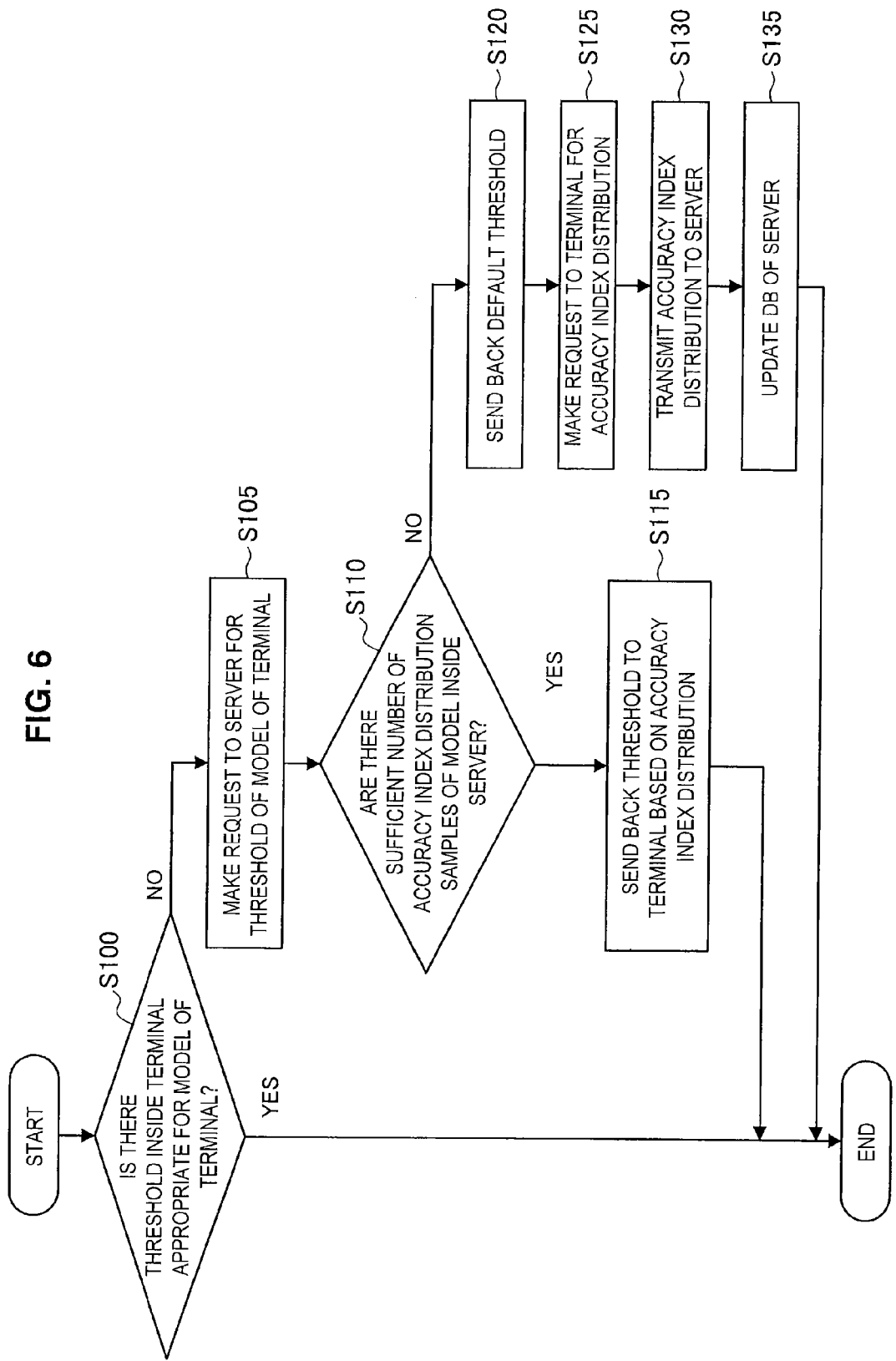
FIG. 6 is a flowchart showing an operation example of the system according to the embodiment.

Next, with reference to FIG. 6, operation of a system according to an embodiment of the present disclosure will be described. FIG. 6 is a flowchart showing an operation example of the system according to the embodiment.

First, the application control section 110 determines whether there is a threshold inside the terminal device 100, which is appropriate for the model of the terminal device 100 (S100). Then, in the case where there is the appropriate threshold inside the terminal device 100, the application control section 110 uses the threshold that is held inside, and hence, the operation of the system is completed. Here, the appropriate threshold may be a threshold determined by using sufficient pieces of information inside the terminal device 100, for example. Alternatively, the appropriate threshold may also be a threshold acquired from the index information server 200 in advance.

Then, when it is determined in Step S100 that there is no appropriate threshold inside the terminal device 100, the application control section 110 makes a request to the index information server 200 for a threshold of a model of the terminal device 100 (S105). Here, for example, the application control section 110 transmits classification information including the name of the model and an acquisition condition (for example, top x %) of the threshold to the index information server 200.

After that, the notification section 215 of the index information server 200 determines whether there are sufficient number of accuracy index distribution information samples inside the index information server 200 (S110). Then, in the case where there are sufficient number of accuracy index distribution information samples inside the index information server 200, the notification section 215 sends back the threshold to the terminal device 100 based on the accuracy index distribution (S115).

On the other hand, in the case where it is determined in Step S110 that there are not sufficient number of accuracy index distribution information samples inside the index information server 200, the notification section 215 sends back a default threshold to the terminal device 100 (S120). Then, the notification section 215 makes a request to the terminal device 100 for information of accuracy index distribution (S125). Here, the default threshold may be a threshold of a similar classification. For example, the notification section 215 may set different models manufactured by a same manufacturer as classifications similar to each other. Here, the different models manufactured by the same manufacturer have parts of the model names that correspond to each other in many cases. Accordingly, whether the models are different models manufactured by the same manufacturer may be determined based on whether parts of the model names correspond to each other, for example. Alternatively, let us consider the case where the classification information includes multiple pieces of information other than the model name. In this case, with increase of the number of pieces of information included in the classification information, the probability that the classification of the accuracy index becomes accurate increases. However, for example, although the model is actually different, the accuracy index may exhibit the same behavior when the sensor with the same model number is used. Accordingly, the notification section 215 may send back, as the default threshold to the terminal device 100, a threshold of a classification in which the model is different and the model number of the sensor is the same.

In response to the request from the index information server 200, the terminal device 100 transmits the information of accuracy index distribution collected inside the terminal device 100 to the index information server 200 (S130). The accepting section 205 of the index information server 200 updates the information of the model-based accuracy index distribution DB 210 based on the information received from the terminal device 100 (S135).

More accurate accuracy index distribution can be obtained also inside the terminal device 100 when the information of accuracy index distribution is collected individually. Up to here, the description has been made on the example in which the accuracy index distribution is collected for each model, but actually, the accuracy indices of the same model may show different trends from each other. Although described in detail later, accuracy indices may be assigned to the same models based on different standards, respectively, when the versions of the software operating therein are different from each other, for example. Accordingly, until the sufficient number of information samples are collected inside the terminal device 100, threshold processing may be performed based on the information acquired from the index information server 200, and after the sufficient number of information samples are collected, the threshold processing may be performed based on the information collected inside the terminal device 100. By performing such an operation, more accurate information can be acquired.

Note that, here, although the default threshold is sent back in the case where the sufficient number of information samples are not collected inside the index information server 200, the present technology is not limited thereto. For example, in the case where the sufficient number of information samples is not collected inside the index information server 200, an error message may be sent back. In this case, exception handling is executed inside the terminal device 100.

Note that, in the present specification, the steps written in the flowchart may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

<4. Hardware Configuration>

Figure 7:
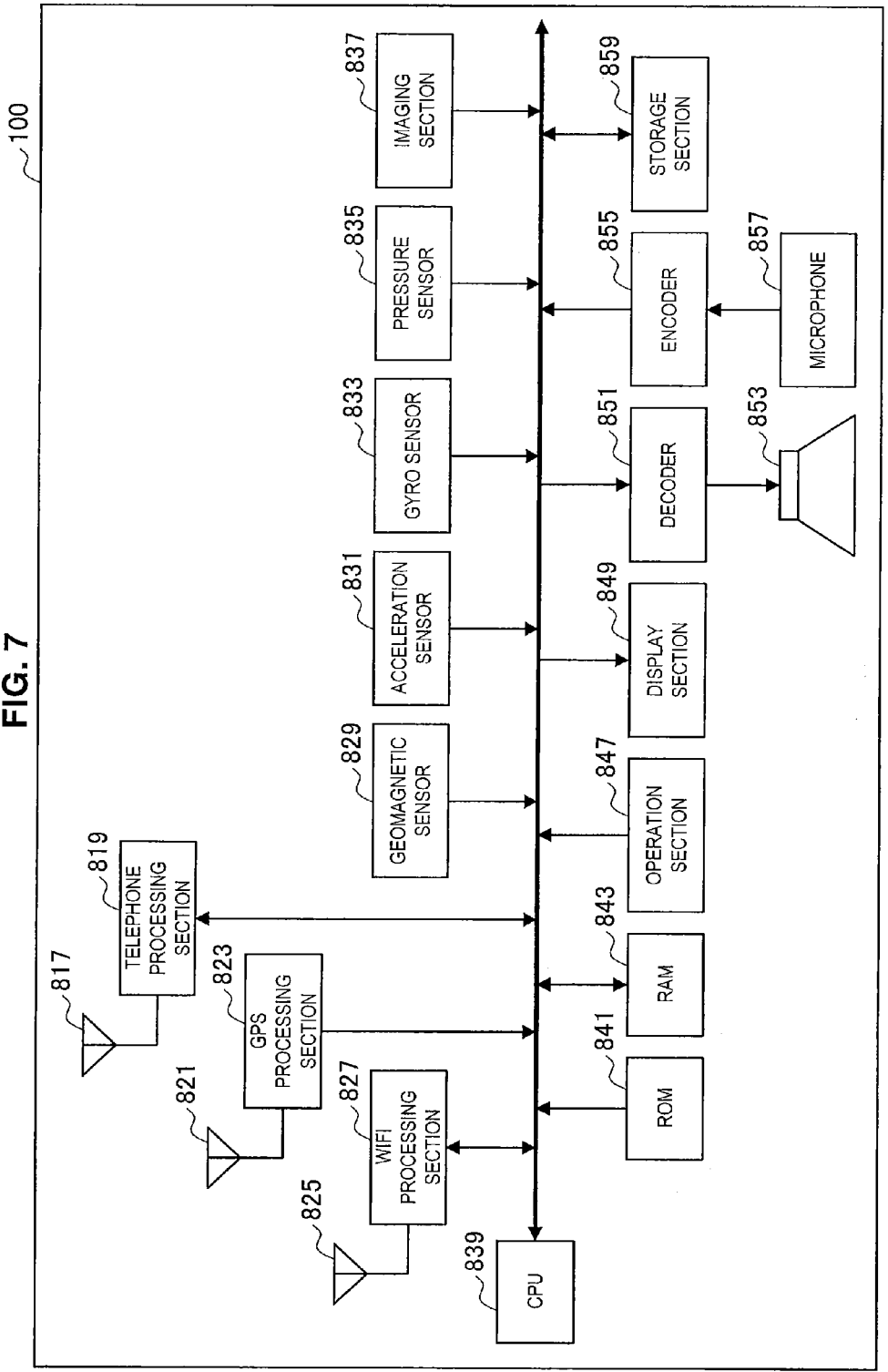
FIG. 7 is a block diagram showing a hardware configuration example of the terminal device according to the embodiment.
Figure 8:
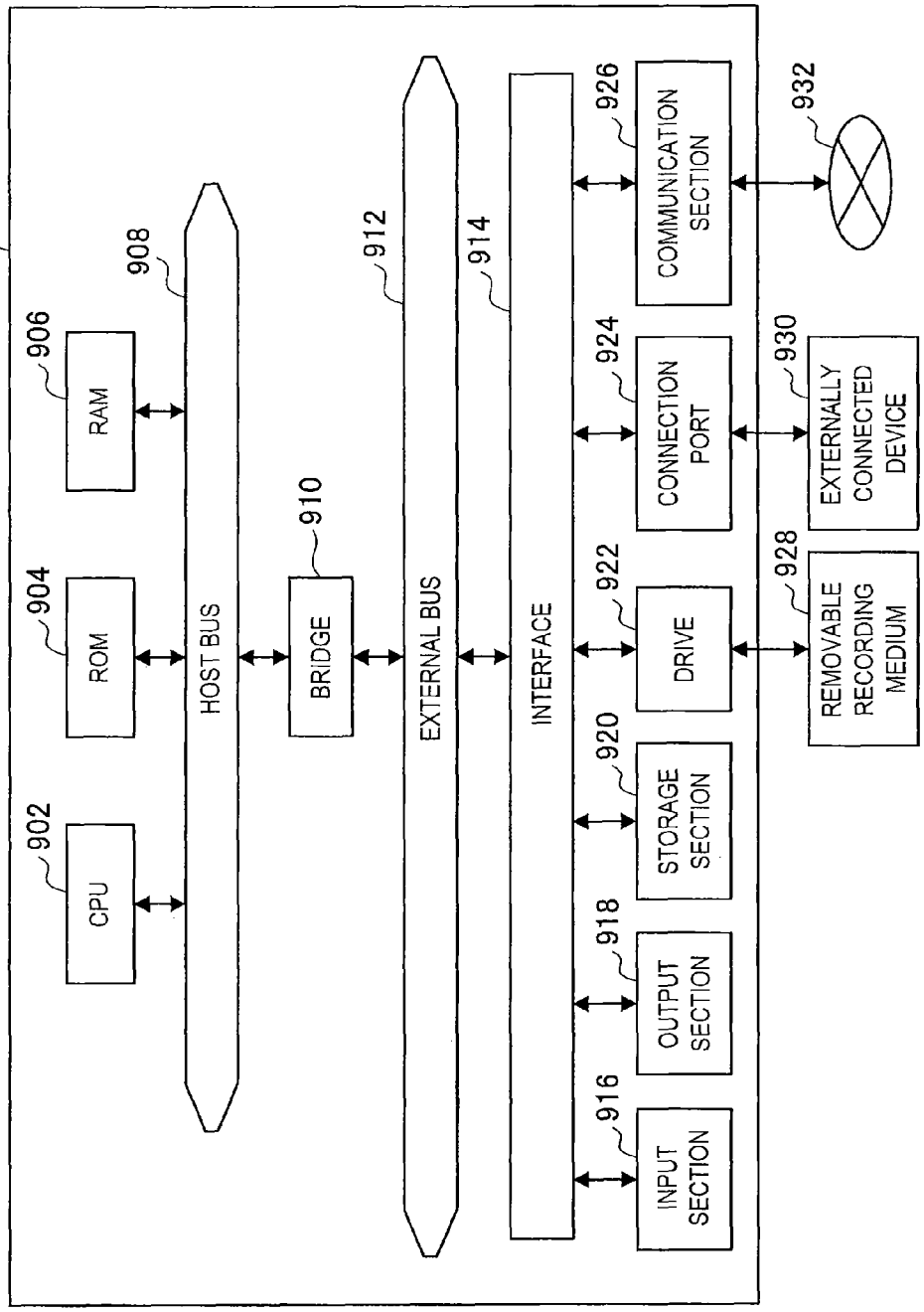
FIG. 8 is a block diagram showing a hardware configuration example of the index information server according to the embodiment.

Next, with reference to FIG. 7 and FIG. 8, hardware configurations of the terminal device 100 and the index information server 200 according to an embodiment of the present disclosure will be described. FIG. 7 is a block diagram showing a hardware configuration example of the terminal device according to the embodiment. FIG. 8 is a block diagram showing a hardware configuration example of the index information server according to the embodiment.

((Terminal Device 100))

Here, an example of the configuration of the terminal device 100 will be described. Referring to FIG. 7, the terminal device 100 includes, for example, a telephone network antenna 817, a telephone processing section 819, a GPS antenna 821, a GPS processing section 823, a WiFi antenna 825, a WiFi processing section 827, a geomagnetic sensor 829, an acceleration sensor 831, a gyro sensor 833, a pressure sensor 835, an imaging section 837, a CPU (Central Processing Unit) 839, a ROM (Read Only Memory) 841, a RAM (Random Access Memory) 843, an operation section 847, a display section 849, a decoder 851, a speaker 853, an encoder 855, a microphone 857, and a storage section 859. Note that the hardware configuration shown here is merely an example, and some of the structural elements may be omitted. Further, the hardware configuration may of course include structural elements other than the above-mentioned structural elements.

(Telephone Network Antenna 817)

The telephone network antenna 817 is an example of an antenna having a function of establishing a connection via radio waves with a mobile phone network for telephone call and data communication. The telephone network antenna 817 can supply the telephone processing section 819 with a telephone call signal received through the mobile phone network.

(Telephone Processing Section 819)

The telephone processing section 819 has a function of performing various types of signal processing on a signal transmitted/received by the telephone network antenna 817. For example, the telephone processing section 819 can perform various types of processing on an audio signal which is input through the microphone 857 and encoded by the encoder 855, and can supply the telephone network antenna 817 with the audio signal. Further, the telephone processing section 819 can perform various types of processing on an audio signal supplied by the telephone network antenna 817, and can supply the decoder 851 with the audio signal.

(GPS Antenna 821)

The GPS antenna 821 is an example of an antenna which receives a signal from a positioning satellite. The GPS antenna 821 is capable of receiving GPS signals from multiple GPS satellites, and inputs the received GPS signals to the GPS processing section 823.

(GPS Processing Section 823)

The GPS processing section 823 is an example of a calculation section which calculates position information based on the signals received from the positioning satellites. The GPS processing section 823 calculates current position information based on the multiple GPS signals input from the GPS antenna 821, and outputs the calculated position information. To be specific, the GPS processing section 823 calculates positions of the respective GPS satellites based on the orbital data of the GPS satellites, and calculates distances from the respective GPS satellites to the terminal device 100 based on the differences between transmission time and reception time of the GPS signals. Then, based on the calculated positions of the respective GPS satellites and the calculated distances from the respective GPS satellites to the terminal device 100, a current three-dimensional position can be calculated. Note that the orbital data of GPS satellites used here may be included in the GPS signals, for example. Alternatively, the orbital data of GPS satellites may be acquired from an external server via the WiFi antenna 825.

(WiFi Antenna 825)

The WiFi antenna 825 is an antenna having a function of transmitting/receiving a communication signal to/from a wireless local area network (LAN) communication network in accordance with the WiFi specification, for example. The WiFi antenna 825 can supply the WiFi processing section 827 with the received signal.

(WiFi Processing Section 827)

The WiFi processing section 827 has a function of performing various types of signal processing on the signal supplied by the WiFi antenna 825. The WiFi processing section 827 can supply the CPU 839 with a digital signal generated from the supplied analog signal.

(Geomagnetic Sensor 829)

The geomagnetic sensor 829 is a sensor for detecting geomagnetism as a voltage value. The geomagnetic sensor 829 may be a 3-axis geomagnetic sensor which detects geomagnetism in the X-axis direction, the Y-axis direction, and the Z-axis direction. The geomagnetic sensor 829 can supply the CPU 839 with the detected geomagnetic data.

(Acceleration Sensor 831)

The acceleration sensor 831 is a sensor for detecting acceleration as a voltage value. The acceleration sensor 831 may be a 3-axis acceleration sensor which detects acceleration along the X-axis direction, acceleration along the Y-axis direction, and acceleration along the Z-axis direction. The acceleration sensor 831 can supply the CPU 839 with the detected acceleration data.

(Gyro Sensor 833)

The gyro sensor 833 is a measuring instrument for detecting an angle or an angular velocity of an object. The gyro sensor 833 may be a 3-axis gyro sensor which detects a variable velocity (angular velocity) of the rotation angle around each of the X-axis, the Y-axis, and the Z-axis as a voltage value. The gyro sensor 833 can supply the CPU 839 with the detected angular velocity data.

(Pressure Sensor 835)

The pressure sensor 835 is a sensor for detecting the surrounding pressure as a voltage value. The pressure sensor 835 detects a pressure at a predetermined sampling frequency, and can supply the CPU 839 with the detected pressure data.

(Imaging Section 837)

The imaging section 837 has a function of capturing a still image or a moving image via a lens in accordance with control of the CPU 839. The imaging section 837 may cause the storage section 859 to store the captured image.

(CPU 839)

The CPU 839 functions as an arithmetic processing unit and a control unit, and controls the overall operation inside the terminal device 100 in accordance with various programs. Further, the CPU 839 may be a microprocessor. The CPU 839 can realize various functions in accordance with various programs.

(ROM 841, RAM 843)

The ROM 841 can store programs and arithmetic parameters used by the CPU 839. The RAM 843 can temporarily store programs used during execution of the CPU 839 and parameters that appropriately change during the execution thereof.

(Operation Section 847)

The operation section 847 has a function of generating an input signal used by a user for performing a desired operation. For example, the operation section 847 may be configured from, for example, an input section for inputting information by the user, such as a touch sensor, a mouse, a keyboard, a button, a microphone, a switch, and a lever, and an input control circuit which generates an input signal based on the input by the user and outputs the generated input signal to the CPU 839.

(Display Section 849)

The display section 849 is an example of an output device, and may be a liquid crystal display (LCD) device, an organic light emitting diode (OLED) display device, or the like. The display section 849 displays a screen to the user, and thereby being able to provide information.

(Decoder 851, Speaker 853)

The decoder 851 has a function of performing decoding, analog conversion, and the like of input data in accordance with the control of the CPU 839. The decoder 851 can perform decoding, analog conversion, and the like of audio data input through the telephone network antenna 817 and the telephone processing section 819, and can output an audio signal to the speaker 853, for example. Further, the decoder 851 can perform decoding, analog conversion, and the like of audio data input through the WiFi antenna 825 and the WiFi processing section 827, and can output an audio signal to the speaker 853, for example. The speaker 853 can output the audio based on the audio signal supplied from the decoder 851.

(Encoder 855, Microphone 857)

The encoder 855 has a function of performing digital conversion, encoding, and the like of input data in accordance with the control of the CPU 839. The encoder 855 can perform digital conversion, encoding, and the like of an audio signal input from the microphone 857, and can output audio data. The microphone 857 can collect audio and output the audio as an audio signal.

(Storage Section 859)

The storage section 859 is a device for storing data, and can include a storage medium, a recording device for recording data in the storage medium, a reading device for reading the data from the storage medium, and a deletion device for deleting the data recorded in the storage medium. Here, as the storage medium, there may be used a non-volatile memory such as a flash memory, a magnetoresistive random access memory (MRAM), a ferroelectric random access memory (FeRAM), a phase change random access memory (PRAM), and an electronically erasable and programmable read only memory (EEPROM), and a magnetic recording medium such as a hard disk drive (HDD).

((Index Information Server 200)) Next, referring to FIG. 8, the function of each structural element included in the index information server 200 may be realized by using the hardware configuration shown in FIG. 8, for example. That is, the function of each structural element may be realized by controlling the hardware shown in FIG. 8 using a computer program.

As shown in FIG. 8, the hardware mainly includes a CPU 902, a ROM 904, a RAM 906, a host bus 908, and a bridge 910. In addition, the hardware includes an external bus 912, an interface 914, an input section 916, an output section 918, a storage section 920, a drive 922, a connection port 924, and a communication section 926. Note that "CPU" is an abbreviation for "central processing unit". Further, "ROM" is an abbreviation for "read only memory". Still further, "RAM" is an abbreviation for "random access memory". Note that the hardware configuration shown here is merely an example, and some of the structural elements may be omitted. Further, the hardware configuration may of course include structural elements other than the above-mentioned structural elements.

The CPU 902 functions as an arithmetic processing unit or a control unit, and controls the overall operation or a part of the operation of each structural element based on various programs recorded in the ROM 904, the RAM 906, the storage section 920, or a removable recording medium 928. The ROM 904 is a unit for storing a program to be read by the CPU 902, data used for calculation, and the like. The RAM 906 temporarily or permanently stores a program to be read by the CPU 902, various parameters that appropriately change when executing the program, and the like.

Those structural elements are connected to each other via, for example, the host bus 908 capable of performing high-speed data transmission. On the other hand, the host bus 908 is connected via the bridge 910 to the external bus 912 whose data transmission speed is relatively low, for example. Further, as the input section 916, there are used a mouse, a keyboard, a touch panel, a button, a switch, or a lever, for example. Also, the input section 916 may be a remote control that can transmit a control signal by using an infrared ray or other radio waves.

The output section 918 is, for example, a display device such as a CRT, an LCD, a PDP, or an ELD, an audio output device such as a speaker or headphones, a printer, a mobile phone, or a facsimile, that can visually or auditorily notify a user of acquired information. Note that, "CRT" is an abbreviation for "cathode ray tube". Further, "LCD" is an abbreviation for "liquid crystal display". Still further, "PDP" is an abbreviation for "plasma display panel". Also, "ELD" is an abbreviation for "electro-luminescence display".

The storage section 920 is a device for storing various data. The storage section 920 is, for example, a magnetic storage device such as an HDD, a semiconductor storage device, an optical storage device, or a magneto-optical storage device. Note that "HDD" is an abbreviation for "hard disk drive".

The drive 922 is a device that reads information recorded on the removal recording medium 928 such as a magnetic disk, an optical disc, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card having a non-contact IC chip mounted thereon or an electronic device. Note that "IC" is an abbreviation for "integrated circuit".

The connection port 924 is a port such as a USB port, an IEEE1394 port, an SCSI, an RS-232C port, or a port for connecting an externally connected device 930 such as an optical audio terminal. The externally connected device 930 is, for example, a printer, a mobile music player, a digital camera, a digital video camera, or an IC recorder. Note that "USB" is an abbreviation for "universal serial bus". Also, "SCSI" is an abbreviation for "small computer system interface".

The communication section 926 is a communication device to be connected to the network 932, and is, for example, a communication card for a wired or wireless LAN, Bluetooth (registered trademark), or WUSB, an optical communication router, an ADSL router, or various communication modems. The network 932 connected to the communication section 926 is configured from a wire-connected or wirelessly connected network, and is the Internet, a home-use LAN, infrared communication, visible light communication, broadcasting, or satellite communication, for example. Note that "LAN" is an abbreviation for "local area network". Also, "WUSB" is an abbreviation for "wireless USB". Further, "ADSL" is an abbreviation for "asymmetric digital subscriber line".

<5. Modified Example>

It should be understood by those skilled in the art that various modifications, combinations, sub-combinations and alterations may occur depending on design requirements and other factors insofar as they are within the scope of the appended claims or the equivalents thereof.

For example, in the embodiment above, for simplicity of the description, the description has been made on the example in which when the sensor section 105 is the GPS sensor, using the model name for the classification information, the appearance frequency distribution of accuracy indices each shown as a distance is collected. Further, in this example, the terminal device 100 acquires and uses in the application the x %-threshold. However, the present technology is not limited thereto. For example, the present technology can be applied to examples using the respective elements as shown below.

(Type of Sensor)

For example, in the above embodiment, the description has been made on the accuracy index of the GPS sensor, but the application range of the present technology is not limited thereto. For example, the sensor section 105 may be a sensor such as the geomagnetic sensor 829, the acceleration sensor 831, the gyro sensor 833, or the pressure sensor 835. Alternatively, the sensor section 105 may be all sensors that measures positions based on environmental information, such as a WiFi positioning section.

Further, although the embodiment described above used GPS as an example of the positioning satellite, the positioning satellite is of course not limited to the GPS. The positioning satellite may be various types of positioning satellites such as Galileo, GLONASS, COMPASS, and MICHIBIKI. In this case, one type of positioning satellite may be used, or positioning signals obtained from multiple types of satellites may be used in combination. The configuration to be used for acquiring position information can be changed appropriately in accordance with the technical level each time when the embodiment is carried out.

Further, the WiFi positioning section is given above as an example of the sensor section that measures a position based on the environmental information, but the present technology is not limited thereto. For example, as the sensor section that measures a position based on the environmental information, a sensor may be used, which acquires position information using various types of indoor positioning technology. Examples of the technology used for indoor positioning include an indoor messaging system (IMES) which is also referred to as indoor GPS, visible light communication, infrared data communication, a radio frequency identification (RFID) tag, and a quick response (QR) code.

(Accuracy Index)

For example, the offsets of the acceleration sensor 831, the gyro sensor 833, and the pressure sensor 835 vary in accordance with peripheral temperature. Accordingly, an accuracy index indicating whether the calibration is performed may be used. Further, in the geomagnetic sensor, an offset occurs by a static magnetic field inside the device. Accordingly, an accuracy index indicating whether the calibration is performed may be used. Those accuracy indices may each be expressed by an analog numerical value indicating the accuracy. Alternatively, those accuracy indices may be expressed in a manner that numerical values indicating the accuracies are classified into levels in stages. Further, for sensors having various positioning functions, such as the WiFi positioning section, an accuracy index expressed by a distance error may be used in the same manner as the GPS sensor.

(Classification Information)

The classification information, for which the model name is used in the above embodiment, can include a model number, a model number of the sensor section 105, a version of an operating system (OS), a version of a device driver, and a device version, for example. Note that, which information is to be included as the classification information may be determined by the index information server 200. In this case, the index information server 200 may designate information to be included in the classification information and may collect index information.

Note that with increase of the number of pieces of information included in the classification information, the probability that the classification of the accuracy index becomes accurate increases. However, for example, in the case of exhibiting the same behavior even though the OS version is actually different and the same model is used, the number of samples included in the same classification decreases by increasing the number of pieces of information included in the classification information. Accordingly, the index information server 200 may collect information by increasing for a limited period the number of pieces of information included in the classification information. For example, the index information server 200 can use for a limited period the classification information including the OS version in addition to the model name. Then, when there is no difference in the trend of the accuracy indices for each OS version, information may be integrated by causing the classification information to include only the model name again.

(Updating of Information of DB)

Further, in the above embodiment, the terminal device 100 collects for a predetermined period and transmits to the index information server 200 the appearance frequency of accuracy indices, but the present technology is not limited thereto. For example, the terminal device 100 may transmit to the index information server 200 an accuracy index each time the sensor section 105 detects information. The frequency that the terminal device 100 transmits information to the index information server 200 may be determined in accordance with a frequency that the sensor section 105 detects information, for example. For example, in the case where the frequency that the sensor section 105 detects the information is low, the updating section 115 may update the information of the index information server 200 each time the sensor section 105 detects the information. Further, in the case where the frequency that the sensor section 105 detects the information is high, the updating section 115 can accumulate information of the appearance frequency of accuracy indices inside the terminal device 100 for a certain period of time and then can update the information of the index information server 200.

(Acquisition Condition)

Further, in the above embodiment, the description has been made on the example in which the application control section 110 of the terminal device 100 makes a request for the top x %-threshold, but the present technology is not limited thereto. For example, the application control section 110 may make a request for the bottom x %-threshold. Further, the application control section 110 may also make a request for summary statistics as a measure of central tendency. Examples of the summary statistics include a variance, a standard deviation, an average, a mode, a maximum value, and a minimum value. Further, the application control section 110 may make a request for the distribution itself of accuracy indices. For example, in the case where the positional accuracy is low, as for a model which sends back at all times a distance error having sufficiently large value, the trend of the accuracy indices as a whole may not be recognized when using only the summary statistics or the threshold. Accordingly, when the distribution itself of accuracy indices is acquired, the trend of the accuracy indices can be grasped accurately.

Additionally, the present technology may also be configured as below.

(1) An information processing apparatus including:

a transmission section which transmits, to an external device that has collected an index pertaining to a feature of an output of a sensor for each classification, classification information for specifying the classification; and a reception section which receives information about the index corresponding to the classification information.

(2) The information processing apparatus according to (1), wherein the classification information includes information for identifying a model of the information processing apparatus.

(3) The information processing apparatus according to (1) or (2), wherein the classification information includes information for identifying a type of the sensor.

(4) The information processing apparatus according to any one of (1) to (3), wherein the classification information includes information indicating a version of an operating system of the information processing apparatus.

(5) The information processing apparatus according to any one of (1) to (4), wherein the classification information includes information indicating a version of software for calculating the index.

(6) The information processing apparatus according to any one of (1) to (5), wherein the reception section receives information about appearance frequency distribution of the indices.

(7) The information processing apparatus according to (6), wherein the reception section receives a threshold based on the appearance frequency distribution of the indices.

(8) The information processing apparatus according to any one of (1) to (7), further including:

an updating section which transmits the classification information and the index to the external device.

(9) The information processing apparatus according to any one of (1) to (8), further including:

a processing section which processes the output of the sensor based on the information about the index.

(10) The information processing apparatus according to (9), wherein the reception section receives appearance frequency distribution of the indices, and wherein the processing section processes the output of the sensor based on the appearance frequency distribution.

(11) The information processing apparatus according to any one of (1) to (10), wherein the sensor is a sensor used for measuring positions.

(12) The information processing apparatus according to any one of (1) to (11),
wherein the index is an accuracy index indicating accuracy of the output of the sensor.

(13) The information processing apparatus according to (12),
wherein the index is an accuracy index indicating an error of the output of the sensor.

(14) The information processing apparatus according to (13),
wherein the sensor is a positioning sensor which measures positions based on environmental information, and
wherein the index is an accuracy index indicating a positional error.

(15) The information processing apparatus according to (12),
wherein the index is information indicating whether the sensor has been calibrated.

(16) An information processing method including:
transmitting, to an external device that has collected an index pertaining to a feature of an output of a sensor for each classification, classification information for specifying the classification; and
receiving information about the index corresponding to the classification information.

(17) A program for causing a computer to function as an information processing apparatus including
a transmission section which transmits, to an external device that has collected an index pertaining to a feature of an output of a sensor for each classification, classification information for specifying the classification, and
a reception section which receives information about the index corresponding to the classification information.

The present disclosure contains subject matter related to that disclosed in Japanese Priority Patent Application JP 2011-281351 filed in the Japan Patent Office on Dec. 22, 2011, the entire content of which is hereby incorporated by reference.

What is claimed is:

1. An information processing apparatus comprising:
a sensor;
a memory; and
processing circuitry configured to
determining whether the memory stores threshold information for the information processing apparatus;
transmit, when the memory does not store the threshold information, a request to an external device for the threshold information;
receive, from the external device when the external device does not possess a sufficient number of threshold samples, a default apparatus threshold and a request for index information;
transmit, in response to the request received from the external device, classification information and an index of an output of the sensor to the external device that collects indices of an output feature of sensors, the classification information including model identification information of the sensor and information that indicates a version of an operating system of the information processing apparatus, and
receive, from the external device when the external device does possess the sufficient number of threshold samples, information about the index corresponding to the classification information, the information including an appearance frequency distribution of the index and a threshold based on the appearance frequency distribution of the index, wherein
the appearance frequency distribution includes distribution information that compares indices, measured by devices with the same classification information, to an appearance frequency of each of the indices, and
the threshold indicates an accuracy of the output of the sensor.

2. The information processing apparatus according to claim 1, wherein the classification information further includes information that indicates a version of software for calculating the index.

3. The information processing apparatus according to claim 1, wherein the processing circuitry is further configured to process the output of the sensor based on the information about the index.

4. The information processing apparatus according to claim 3, wherein the processing circuitry is further configured to
receive the appearance frequency distribution of the indices, and
process the output of the sensor based on the appearance frequency distribution.

5. The information processing apparatus according to claim 1, wherein the sensor is configured to measure a position of the information processing apparatus.

6. The information processing apparatus according to claim 1, wherein the index is an accuracy index that indicates an error of the output of the sensor.

7. The information processing apparatus according to claim 6, wherein
the sensor is a positioning sensor which measures positions based on environmental information, and
the index is an accuracy index that indicates a positional error.

8. The information processing apparatus according to claim 1, wherein
the index includes information that indicates whether the sensor has been calibrated.

9. An information processing method comprising:
determining, by processing circuitry, whether a memory stores threshold information of an information processing apparatus;
transmitting, when the memory does not store the threshold information, a request to an external device for the threshold information;
receiving, from the external device when the external device does not possess a sufficient number of threshold samples, a default apparatus threshold and a request for index information;
transmitting, by the processing circuitry in response to the request received from the external device, classification information and an index of an output of a sensor to the external device that collects indices of an output feature of sensors, the classification information including model identification information of the sensor and information that indicates a version of an operating system of the information processing apparatus; and
receiving, by the processing circuitry from the external device when the external device does possess the sufficient number of threshold samples, information about the index corresponding to the classification information, the information including an appearance frequency distribution of the index and a threshold based on the appearance frequency distribution of the index, wherein
the appearance frequency distribution includes distribution information that compares indices, measured by devices with the same classification information, to an appearance frequency of each of the indices, and the threshold indicates an accuracy of the output of the sensor.

10. A non-transitory computer readable medium storing computer readable instructions that, when executed by an information processing apparatus including processing circuitry, cause the computer to execute a process, the process comprising:

determining, by the processing circuitry, whether a memory stores threshold information of the information processing apparatus;

transmitting, when the memory does not store the threshold information, a request to an external device for the threshold information;

receiving, from the external device when the external device does not possess a sufficient number the threshold samples, a default apparatus threshold ad a request for index information;

transmitting, by the processing circuitry in response to the request received from the external device, classification information and an index of an output of a sensor to the external device that collects indices of an output feature of the sensors, the classification information including model identification information of the sensor and information that indicates a version of an operating system of the information processing apparatus; and receiving, by the processing circuitry from the external device when the external device does possess the sufficient number the threshold samples, information about the index corresponding to the classification information, the information including an appearance frequency distribution of the index and a threshold based on the appearance frequency distribution of the index, wherein the appearance frequency distribution includes distribution information that compares indices, measured by devices with the same classification information, to an appearance frequency of each of the indices, and the threshold indicates an accuracy of the output of the sensor.

11. The information processing method according to the claim 9, further comprising processing the output of the sensor based on the information about the index.

12. The information processing method according to claim 11, further comprising:

receiving the appearance frequency distribution of the indices, and processing the output of the sensor based on the appearance frequency distribution.

13. The information processing method according to claim 9, further comprising measuring, with the sensor, a position.

14. The information processing method according to claim 9, wherein the index is an accuracy index that indicates an error of the output of the sensor.

* * * * *